United States Patent [19]

Meyer

[11] Patent Number: 4,912,360
[45] Date of Patent: Mar. 27, 1990

[54] LAMP WITH TWO INTERNAL CAPSULES

[76] Inventor: Kevin L. Meyer, 50 Apple Rd., Beverly, Mass. 01915

[21] Appl. No.: 236,498

[22] Filed: Aug. 25, 1988

[51] Int. Cl.⁴ .......................... H01J 61/34; F21S 3/00
[52] U.S. Cl. ........................................... 313/1; 313/25; 313/324; 362/224
[58] Field of Search .................... 313/1, 25, 579, 316, 313/323, 324; 362/224, 219, 225

[56] References Cited

U.S. PATENT DOCUMENTS

| | | | |
|---|---|---|---|
| 1,696,663 | 12/1928 | Becker | 439/235 |
| 4,285,032 | 8/1981 | Honda et al. | 313/324 X |
| 4,647,809 | 3/1987 | Blaisdell et al. | 313/25 |

Primary Examiner—Sandra O'Shea
Attorney, Agent, or Firm—William E. Meyer

[57] ABSTRACT

A double filamented lamp with one filament being a back up for the other filament may be formed with two internal capsules enclosed in a single exterior sheath. Each filament is securely positioned away from, and protected from the activity of the other filament. By securely coupling one capsule to the sheath, and the second capsule to the lamp base, both capsules are accurately positioned, and do not vibrate in the exterior sheath.

16 Claims, 1 Drawing Sheet

LAMP WITH TWO INTERNAL CAPSULES

TECHNICAL FIELD

The invention relates to electric lamps, and particularly to filamented electric lamps. More particularly the invention is concerned with double filament lamps where a first filament may be backed up by a second filament.

BACKGROUND ART

The common procedure for making a lamp with a backup filament is to have both filaments enclosed in the same envelope. An external mechanism switches from one filament to the other when the first filament fails. The two filaments are generally positioned in the lamp envelope to not contact one another during lamp operation, since filaments sag or become slinky with heat, and age. Filaments swing, and vibrate with lamp motions, so the filaments are also positioned to not contact one another during lamp motions. Positioning and motion control have usually meant internal metal supports to restrict filament motion, but internal supports require additional manufacturing expense, and internal attachments to or through the envelope. Internal suppors may weaken the envelope or seal. There is then a need to design a double filament lamp without internal metal filament supports.

In double filamented lamps, the first and second filaments, and the filament supports are frequently close. The light from the lit filament falls on the unlit filament, any filament remains from an exhausted filament, and any filament supports, casting shadows on the lighted subject. The filament, and support locations are therefore normally designed to achieve the least shadow for a particular use; however, the easiest solution of placing the filaments side by side in parallel invites vibrational contact, and the next easiest solution of separating the filaments leads to large envelopes, extended support structures, and generally more complex and expensive internal structures. There is then a need to provide a simple inexpensive means of locating and supporting two filaments that reduces shadowing, and complex support.

Double filamented lamps enclosed in a single envelope can also fail completely when the first filament fails normally due to age, but releases filament fragments that may fall on the back up filament. The second or back up filament then either lights along with the fallen material in an odd display, or fails due to shorting or mechanical stress. There is then a need for a double filament lamp where a failed filament cannot interfere with the operation of the back up filament.

In an incandescent lamp, and even in tungsten halogen lamps where the halogen cycle is functioning, there is some deposition of the filament material on the envelope walls as the filament ages with use. Tungsten deposition occurs most readily where the inside of the lamp envelope is coolest. In a double filamented lamp, where one filament is positioned away from a second filament for mechanical or electrical security, the back up filament is likely to be close to the coolest portions of the lamp envelope. The result is the first filament evaporates during normal operation, and the envelope around the second filament is darkened by the depositing material. The second filament is then obscured by the deposition of the materials from the first filament. There is then a need to protect the light path for the back up filament from being degraded by deposited materials during the operation of the first filament.

In a similar fashion, as the first filament ages, the envelope fill gas may be degraded, either by emitted material, filament failure, chemical saturation, or leaked gases. The second filament is therefore likely to operate in a less than ideal fill gas. There is then a need to protect the fill gas for the second filament from being degraded by operation of the first filament.

Numerous U.S. patents show examples of double filamented lamps. U.S. Pat. No. 1,581,690 to A. L. Powell for a Two-Filament Street Series Lamp shows two filaments in a single envelope with means for connecting the second filament when the first filament fails. U.S. Pat. No. 1,713,753 to F. Eckhardt et al for an Electric Incandescent Lamp shows a lamp with two filaments in a single envelope allowing a selection of filaments according to the applied voltage. Other U.S. patents showing double filamented lamps includes at least the following 1,717,283; 1,859,661; 2,029,211; 2,074,246; 2,084,176; 2,161,443; 2,862,147; 3,327,162; 3,319,115; 3,458,756; and 3,697,802.

DISCLOSURE OF THE INVENTION

A double filamented lamp where one filament serves as a back up for another filament may be improved by forming a single exterior sheath from a light transmissive material and enclosing two internal lighting capsules. The exterior sheath has an enclosed volume with an internal diameter, and an internal length sufficient to contain the two lighting capsules. The first and second internal lighting capsules positioned in the exterior sheath, have capsule envelopes formed from a light transmissive material defining enclosed volumes. Capsule filaments are positioned in the respective enclosed volumes, and exit leads extend from the respective filaments through the capsule envelopes and the exterior sheath for electrical connection. A spacer may be placed intermediate and securely coupled to the exterior sheath and the first capsule, or between the first and second capsules to assist in securely positioning one or both of the lighting capsules.

BEST MODE FOR CARRYING OUT THE INVENTION

Figure 1:
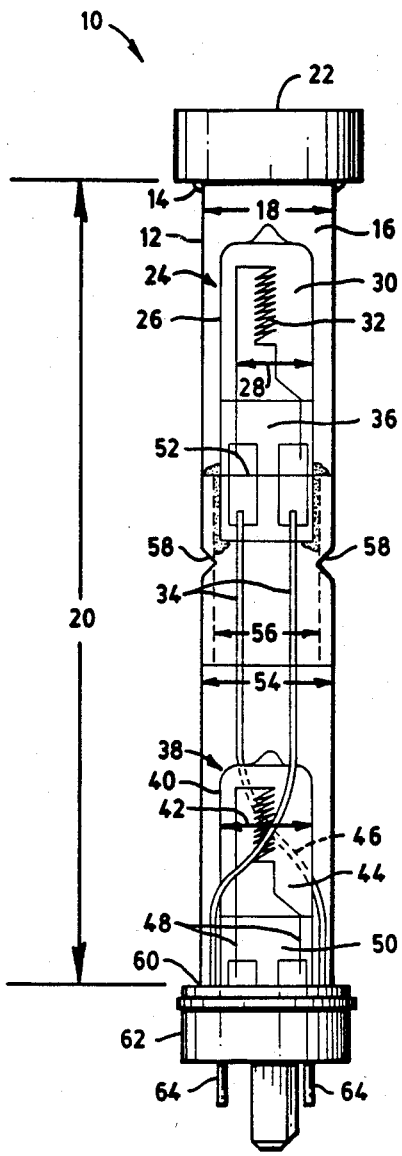
FIG. 1 shows a preferred embodiment of a lamp with two internal capsules.

FIG. 1 shows a preferred embodiment of a lamp 10 with two internal capsules. The lamp 10 broadly comprises an exterior sheath 12 of a light transmissive material enclosing two sealed lighting capsules. In the preferred embodiment, the sheath 12 is made from fused quartz, although hard glass, or other glasses may be used. The preferred sheath 12 conveniently has the form of a tube sealed at a first end 14, encloses a volume 16 with an internal circular cross section with an interior diameter 18, and has an internal axial length 20. The first end 14 may be closed by press sealing, tipping off, or by attaching an end cap 22. The first end 14 may be cemented in a groove or cavity formed in the end cap 22. Applicant prefers to close the sheath 12 with a cemented end cap 22. The sheath 12 may be sand blasted or etched as is known in the art to provide a frosted surface, or for cosmetic purposes.

Positioned in the sheath 12 is a first internal lighting capsule 24. The preferred embodiment of the first capsule 24 has a first capsule envelope 26 formed from a light transmissive material such as fused quartz although hard glass, or other glasses may be used. The first capsule envelope 26 has an outside diameter 28 smaller than the interior diameter 18, so the first capsule 24 may be slipped into the sheath 12. The first capsule 24 is conveniently formed from a tube, tipped at one end, and press sealed at the opposite end to seal a filament structure as is known in the art. The tubular capsule then includes a first enclosed volume 30 housing a first capsule filament 32 positioned and first capsule fill gas. The first filament 32 connects to first capsule exit leads 34 which inturn extend through a first capsule press seal 36 for electrical connection.

Also, positioned in the sheath 12 is a second internal lighting capsule 38. The preferred embodiment of the second capsule 38 has a second capsule envelope 40 formed from a light transmissive material. The second capsule envelope 40 has an outside diameter 42 smaller than the interior diameter 18, so the second capsule 38 may be slipped into the sheath 12. The second capsule 38 is conveniently formed from a tube, tipped at one end, and press sealed at the opposite end to seal a filament structure as is known in the art. The tubular capsule then includes a second enclosed volume 44 housing a second capsule filament 46 positioned and second capsule fill gas. The second filament 46 connects to second capsule exit leads 48 which inturn extend through a second capsule press seal 50 for electrical connection.

Positioned in the sheath 12 and intermediate the first and second capsules is a spacer 52. The spacer 52 should have at least one axial passage or bypass to allow the first capsule leads 34 to pass to the sheath 12 section enclosing the second capsule 38. The preferred embodiment of the spacer 52 is a tubular section having an exterior diameter 54 smaller than the interior diameter of the sheath 12, and an interior diameter 56 greater than the width of the first capsule press seal 36. The exit leads 34 may then be lead thru the spacer 52, and the press seal 36 may be positioned in the interior portion of the spacer 52.

To prevent vibrating, and knocking against the sheath 12 by the first capsule 24, the first capsule 24 is accurately positioned by the spacer 52. In the preferred embodiment, a coupling between the inside wall of the sheath 12, and the first capsule 24 is made by means of the spacer 52. The first capsule 24 is securely coupled to the spacer 52. The preferred coupling is to cement the first capsule press seal 36 in the interior passage of the spacer 52.

The spacer 52 is also securely coupled, preferably to the sheath 12, but possibly to the second capsule 38. Coupling the spacer 52 to the second lighting capsule 38 is thought to allow convenient prealignment of the two capsules; however, additional stress is then placed on the support for the second capsule 38. The preferred coupling is then between the sheath 12 and the spacer 52. Applicant has found a particularly useful means for coupling the sheath 12 to the spacer 52 that substantially reduces mechanical and thermal stress. By heating the sheath 12 adjacent the spacer 52, the sheath 12 may be softened and pinched to close on and hold the spacer 52 in position. The pinch may have the form of one or more melted dimples or point contacts 58 formed in the sheath 12 to contact the spacer 52 forcing the spacer 52 against the interior surface of the sheath 12. The interior surface of the sheath 12 and the pinching point contacts 58 provide a secure positioning of the spacer 52. Alternatively the pinch may have the form of a ring encircling the space 52. Other, pinched contacts are felt to be possible, as are other means of mechanically coupling the sheath 12 and spacer 52 such as metal clips, springs, and similar mechanical couplings.

Alternatively, sheath 12 may be coupled directly to the first capsule 24 and the spacer 52 eliminated. Again, the dimpling method may be used to couple the sheath 12, and the first capsule 24. The direct coupling of the sheath 12 to the first capsule 24 is not preferred due the potential mechanical stress placed on the first capsule 24, the thermal mismatch between the sheath 12 and the first capsule 24, and the requirement of locating and holding the first capsule 24 while the coupling is made.

The first capsule exit leads 34 should be formed from a material that does not evaporate at the temperature of operation. Nickel, molybdenum, and their respective alloys are commonly used as lamps leads, and adequately resist evaporation in the sheath 12. The first capsule leads 34 pass thru the spacer 52 and past the second capsule 38 preferably have a size small enough not to cause objectional photometric defects, or shadowing, but large enough to supply an appropriate current. The first capsule leads 34 are lead between the sheath 12, and the second capsule 38. The leads 34 are preferrably lead around the second capsule 38 in an arcing path so a vertical line shadow is not cast by the first capsule leads 34.

The sheath 12 is sealed at a second end 60 by a lamp base 62. A pressed seal lamp base 62 may be used to separately capture the first and second capsule leads. Similarly, a cemented ceramic end piece may be used. In the preferred embodiment, the first and second capsule leads 34, 48 are connected through the lamp base 62 by pins 64. The preferred lamp base 62 is then a hermetically sealed wafer style base with the capsule leads 34, 48 connecting through the wafer style base by lamp base pins 64. Applicant prefers a four pin base, of which three pins are used. One pin is common to both the first capsule 24, and the second capsule 38. The second capsule 38 is also conveniently cemented to the lamp base 62.

There are numerous exterior switching mechanisms and circuits that may be applied to the double capsule lamp. The lamp is intended to be generally useful, and not restricted to any particular circuit design. Exterior switching circuit designs may be seen in U.S. Pat. No. 3,725,728 to Kenneth G. King for a Fail Safe Lamp Filament Monitoring Circuit; U.S. Pat. No. 4,580,079 to Ronald Koo for a Multifilamented Bulb with Filament Switching Device; and U.K. Pat. No. 2,110,486 to Peter Cross for Automatic Filament Changeover Apparatus for Multifilamented Lamp Installations, all of which are hereby incorporated by reference for purposes of instructing how to use such double filament back up lamps.

In a working example of a lamp with two internal capsules, some of the dimensions were approximately as follows: A ceramic end cap had a diameter of 24.76 mm (0.975 inch), and an axial length of 19.05 mm (0.750 inch). The sheath was made of fused quartz, had an outside diameter of 15.87 mm (0.625 inch) and an inside diameter of 13.71 mm (0.540 inch). The first capsule was a tubular press sealed tungsten halogen lamp cemented to a spacer. The spacer was made of fused quartz, had a length of 38.1 mm (1.5 inch), an outside diameter of 13.00 mm (0.512 inch), and an inside diameter of 5.99 mm (0.236 inch). The spacer was coupled to the sheath by flame heating the sheath and pressing two diametrically spaced dimples inwards to contact the spacer. The lead wires connecting the first capsule to the base pins were nickel with a diameter of 5.08 mm (0.020 inch). The second capsule was a tubular press sealed tungsten halogen lamp identical to the first capsule. The second capsule was cemented to the lamp base for secure positioning. The filament center to filament center distance between the first and second capsules was 76.2 mm (3.00 inch). The distance from the second filament center to the tip of the base end was 33.02 mm (1.30 inch). The base was an ANSI G17T type base with four contact pins extending 8.89 mm (0.350 inch), and a nonconducting centering pin extending 13.97 mm (0.550 inch). Three of the pins were connected, with one of the pins common to both capsules. The base had a diameter of 30.48 mm (1.200 inch). The over lamp length was 146.05 mm (5.750 inch).

With the above working example, the lamp vertically oriented, and the base down, using standard capsule voltage and current, one capsule at a time was lit. The lives of the individual capsules were identical to each other and to the lives of standard capsules. No objectionable photometric defects were detected. In particular, there was no deposition of evaporated material from one filament to obscure the other filament, nor was the fill gas of the back up filament degraded, nor did any first filament fragments interfere with the second filament. The filaments were securely positioned, and not subject to sway or vibrational contact. The capsules were securely positioned, and did not vibrate or knock against the sheath. There was no detected mechanical stress between the sheath, the spacer and the internal capsule. Although two identical lighting capsules are the preferred embodiment used by the applicant, it is known that varying the lighting capsule, either as to electrical, or mechanical attributes may be useful in either aiding the switching circuit, or in signaling a viewer that the first lighting capsule has failed. The convenient choice of nonidentical capsules is then anticipated by applicant for the purposes of switching, signaling or for other purposes. It is also felt that filling the sheath volume with an inert gas may increase to longevity of the two capsules, as no harmful gases may then attack the capsule leads, or leak into the enclosed capsule volumes. The disclosed dimensions, configurations and embodiments are as examples only, and other suitable configurations and relations may be used to implement the invention.

While there have been shown and described what are at present considered to be the preferred embodiments of the invention, it will be apparent to those skilled in the art that various changes and modifications can be made herein without departing from the scope of the invention defined by the appended claims.

What is claimed is:

1. A lamp with two internal capsules comprising:
   (a) an exterior sheath formed from a light transmissive material having an enclosed volume with an internal diameter, and an internal length extending from a first end to a second end,
   (b) a first internal lighting capsule positioned in the exterior sheath, having
      (i) a first capsule envelope formed from a light transmissive material defining a first capsule enclosed volume,
      (ii) a first capsule filament positioned in the first capsule enclosed volume,
      (iii) first capsule exit leads extending from the first filament through the first capsule envelope and the second end of the exterior sheath for electrical connection, and
   (c) a second internal lighting capsule positioned in the exterior sheath, having
      (i) a second capsule envelope formed from a light transmissive material defining a second capsule enclosed volume,
      (ii) a second capsule filament positioned in the second capsule enclosed volume,
      (iii) second capsule exit leads extending from the second filament through the second capsule envelope and the second end of the exterior sheath for electrical connection.

2. The lamp apparatus in claim 1, wherein the external sheath has the form of a tube.

3. The lamp apparatus in claim 2, wherein the external sheath in the form of a tube has a circular cross section.

4. The lamp apparatus in claim 1, wherein the first internal lighting capsule is securely coupled to the exterior sheath.

5. The lamp apparatus in claim 1, wherein the first internal lighting capsule is a tungsten halogen lamp.

6. The lamp apparatus in claim 5, wherein the first internal tungsten halogen lighting capsule has a tubular form with an outer diameter less than the interior diameter of the exterior sheath.

7. The lamp apparatus in claim 5 wherein the second internal lighting capsule is a tungsten halogen lamp with a tubular form with an outer diameter less than the interior diameter of the exterior sheath minus twice the diameter of the exit lead of the first lighting capsule.

8. The lamp apparatus in claim 1, further including a spacer having a first wall portion adjacent a portion of the first lighting capsule, and a second wall portion adjacent the exterior sheath.

9. The lamp apparatus in claim 1, further including a spacer having a first wall portion adjacent a portion of the first lighting capsule, and a second wall portion adjacent the second lighting capsule.

10. The lamp apparatus in claim 8, wherein the spacer is coupled to the first lighting capsule.

11. The lamp apparatus in claim 8, wherein the spacer is coupled to the exterior sheath.

12. A lamp with two internal capsules comprising: (a) an exterior sheath formed from a light transmissive material having an enclosed volume with an internal diameter, and an internal length extending from a first end to a second end,
   (b) a first internal lighting capsule positioned in the exterior sheath, having
      (i) a first capsule envelope formed from a light transmissive material defining a first capsule enclosed volume,
      (ii) a first capsule filament positioned in the first capsule enclosed volume,
      (iii) first capsule exit leads extending from the first filament through the first capsule envelope and the second end of the exterior sheath for electrical connection, (c) a second internal light capsule positioned in the exterior sheath, having
  (i) a second capsule envelope formed from a light transmissive material defining a second capsule enclosed volume,
  (ii) a second capsule filament positioned in the second capsule enclosed volume,
  (iii) second capsule exit leads extending from the second filament through the second capsule envelope and the second end of the exterior sheath for electrical connection, and
(d) a spacer having a first wall portion adjacent a portion of the first lighting capsule, and a second wall portion adjacent the exterior sheath and coupled to the exterior sheath by formations extending from the sheath and contacting the spacer.

13. The lamp apparatus in claim 12, wherein the formations are melted and pressed portions of the exterior sheath.

14. The lamp apparatus in claim 12, wherein the spacer is formed from a light transmissive material.

15. The lamp apparatus in claim 12, wherein the spacer is cemented to the first lighting capsule.

16. The lamp with two internal capsules comprising:
(a) an exterior sheath in the form of a tube sealed at a first end, formed from a light transmissive fused quartz having an enclosed volume with an internal circular cross section with a diameter, and an internal axial length extending from a first end to a second end,
(b) a first internal lighting capsule positioned in the exterior sheath, having
  (i) a first capsule envelope formed from a light transmissive fused quartz defining a first capsule enclosed volume having an outside diameter smaller than the interior diameter of the exterior sheath, and a first capsule press sealed end,
  (ii) a first capsule filament positioned in the first capsule enclosed volume,
  (iii) a first capsule fill gas enclosed in the first capsule enclosed volume, and
  (iv) first capsule exit leads extending from the first capsule filament through the first capsule press seal and the second end of the exterior sheath for electrical connection,
(c) a second internal lighting capsule positioned in the exterior sheath, having
  (i) a second capsule envelope formed from a light transmissive fused quartz defining a second capsule enclosed volume having an outside diameter smaller than the interior diameter of the exterior sheath, and a second capsule press sealed end,
  (ii) a second capsule filament positioned in the second capsule enclosed volume,
  (iii) a second capsule fill gas enclosed in the second capsule enclosed volume, and
  (iv) second capsule exit leads extending from the second capsule filament through the second capsule press seal and the second end of the exterior sheath for electrical connection,
(d) a spacer in the form of a tubular section having an exterior spacer diameter smaller than the interior diameter of the exterior sheath and at least one axial passage to allow the first capsule leads to pass, with the first capsule coupled to the spacer, and the spacer coupled to the exterior sheath, and
(e) a lamp base sealing a second end of the exterior sheath, and having through connections for the first capsule leads and the second capsule leads to be electrically connected to the exterior of the exterior sheath.

* * * * *